Sept. 26, 1933.　　　　M. V. CREEDON　　　　1,928,482
CONVEYER TRANSFER MECHANISM
Filed June 6, 1931　　　　2 Sheets-Sheet 1
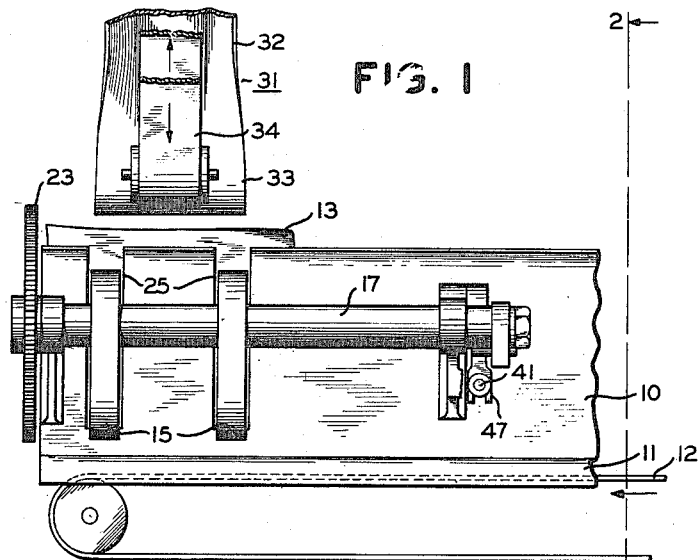
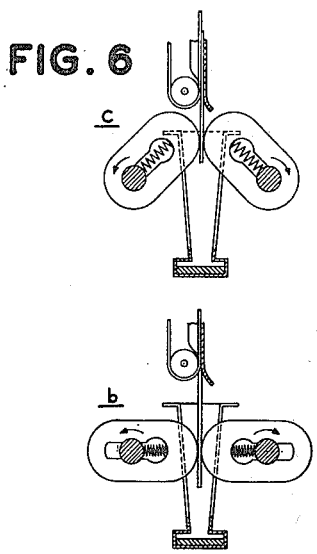
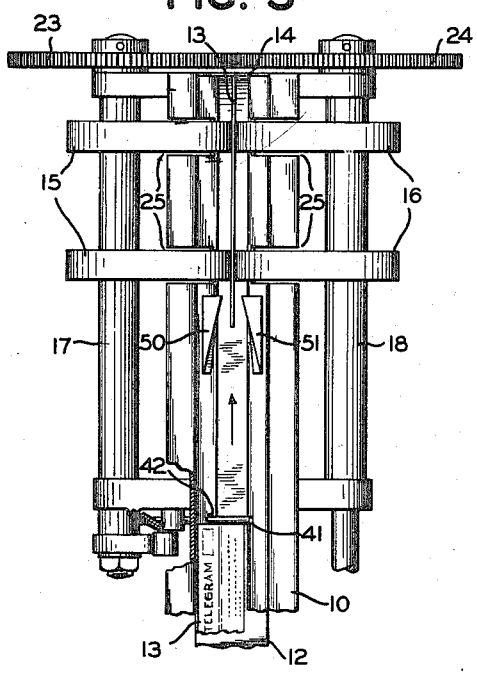
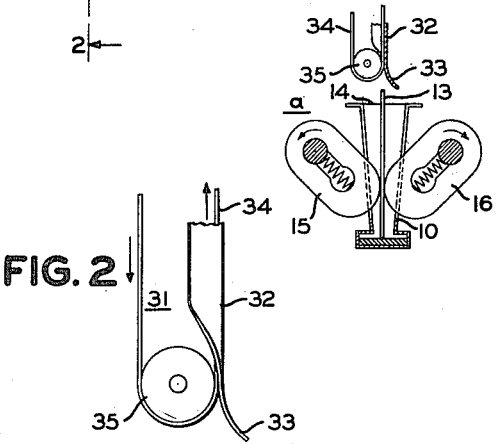
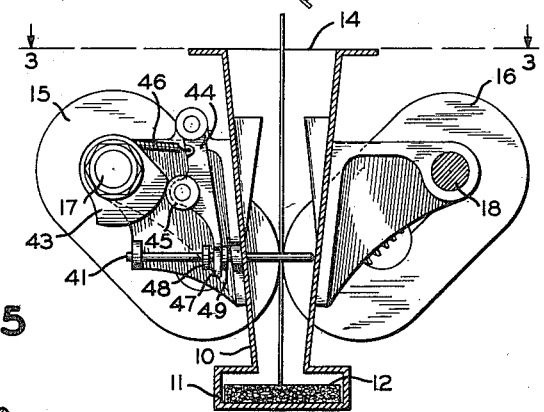
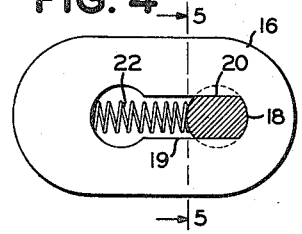
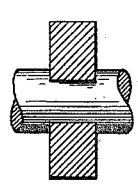
INVENTOR
M. V. CREEDON
BY ATTORNEY
Eugene C. Brown Sept. 26, 1933.  M. V. CREEDON  1,928,482
CONVEYER TRANSFER MECHANISM
Filed June 6, 1931   2 Sheets-Sheet 2

INVENTOR
M.V. CREEDON
BY ATTORNEY
Eugene C. Brown

Patented Sept. 26, 1933

1,928,482

UNITED STATES PATENT OFFICE 1,928,482

CONVEYER TRANSFER MECHANISM

Michael V. Creedon, Westfield, N. J., assignor to The Western Union Telegraph Company, New York, N. Y., a corporation of New York Application June 6, 1931. Serial No. 542,656

6 Claims. (Cl. 198—160)

This invention relates to a conveyer and more particularly to a mechanism for transferring sheet material, such as telegram forms, letters and the like, from a conveyer of the V-trough or vertical trough type into a conveyer of the drag or contacting strap type.

In the vertical trough type of conveyer, such as is shown in a patent granted to d'Humy, Birkmeyer and Griffith, April 21, 1931, No. 1,801,906, and entitled "Belt conveyers," the messages are transported along the conveyer in a substantially vertical or on edge position.

Briefly, such conveyers may comprise a substantially V-shaped open bottom trough having a rectangular conduit at the bottom thereof of greater width than the trough and extending under the edges thereof, through which a belt travels. The articles to be transported are disposed in the trough in substantially a vertical position and are carried along the trough in such position.

It is convenient to employ a conveyer of this form to serve individual groups of telegraph operators, the conveyer being disposed adjacent the back of a row of operating tables as shown in Patent No. 1,780,118, granted October 28, 1930 to F. E. d'Humy. As messages are received they are written on telegram forms or message blanks by the receiving operators, deposited in the trough and carried to the end of the row of operators or row of tables at which point they may be delivered from the V-trough conveyer usually operating at relatively slow speed into the pick-up section of a high speed conveyer of the drag type or of the double strap type, which may extend upwardly to adjacent the ceiling and thence, by means of an overhead run, to a distant distributing center or other desired destination.

Briefly the drag conveyer may consist of a single narrow belt traveling in a stationary channel, the message forms being dragged along the channel beneath the belt by frictional engagement with the belt. The double strap conveyer comprises two contacting straps traveling in the same direction between which the telegram forms are conveyed.

In one form of conveyer system now in use a transfer arrangement is employed in which the message forms, as they arrive at the end of the V-trough conveyer, are directed downwardly by a chute into the inlet of a drag conveyer or double strap conveyer system. While this arrangement has proven highly satisfactory, yet there is a possibility of messages becoming lodged in the chute, which could be obviated by employing a transfer mechanism arranged to grip the message blanks and propel them positively toward the inlet of the high speed conveyer.

One of the objects of the present invention is, therefore, to produce means for transferring articles being transported, from a V-trough conveyer into a drag or double strap or similar type of conveyer, without the use of an intermediate chute or similar stationary guiding member.

Another object is to provide a transfer arrangement which will positively engage the sheet material in the conveyer trough of a relatively low speed conveyer and feed the same therefrom directly into the pick-up section of a high speed conveyer.

Still another object is to produce a transfer arrangement which is simple, dependable and which may be confined to a relatively small space.

These and other objects of my invention will appear from the following description and claims taken in connection with the accompanying drawings forming a part of the application, in which:

Fig. 1 is a view in side elevation of one form of transfer showing the position of the gripping cams and cut off in relation to the conveyer trough;

Fig. 2 is a view in sectional elevation of the conveyer trough taken along the line 2—2 of Fig. 1 showing the relation of the various parts when a message is about to be transferred;

Fig. 3 is a plane view of the transfer mechanism taken along the line 3—3 of Fig. 2.

Fig. 4 is a view in elevation of one of the gripping cams, showing its position on the cam drive shaft;

Fig. 5 is a sectional view taken along 5—5 of Fig. 4;

Fig. 6 is a series of diagrammatic illustrations showing three different stages of the transfer operation;

Figure 7:
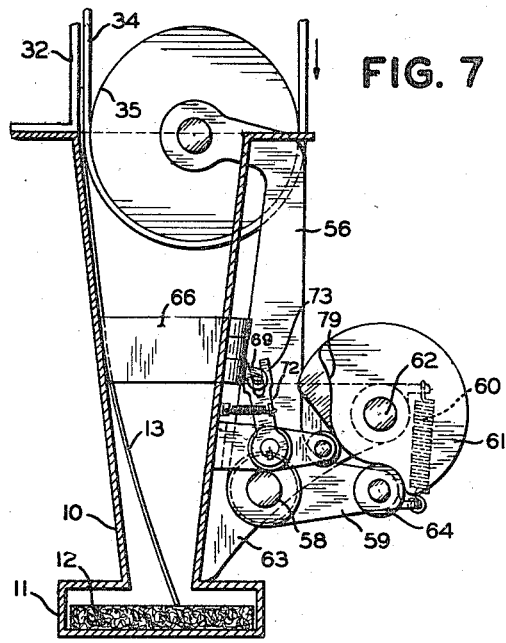
Fig. 7 is a view in sectional elevation of a conveyer trough showing another form of the invention.

According to my invention I have provided, in connection with V-trough conveyers, or conveyers carrying material in substantially vertical position, a conveyer arrangement which positively grips the message blanks or other sheet material as they arrive at a certain position in the trough which will be hereinafter referred to as the transfer position, and directs the blanks upward into the entrance of a relatively high speed conveyer such as drag or double strap conveyers. One form of my invention employs two eccentric cams mounted to yield transversely of their shafts and to come together substantially at the center of the V-trough and engage the message blanks as they arrive at transfer position and propel the latter upwardly into the inlet of a pick-up section of a drag type conveyer. According to the other form of my invention, the drag conveyer belt is extended downwardly and a return roller therefor is mounted pivotally to swing away and back to the side of the V-trough or the extended drag conveyer. The return roller is at suitable position for engaging the edge of messages having arrived between the conveyer belt and the back of the upwardly extending conveyer. As the roller returns to its normal position, the message blanks will be engaged by the upwardly moving section of the belt and propelled into the drag conveyer.

Referring now to the drawings, Figs. 1 to 6 show the transfer arrangement employing lifting means to transfer the message from the V trough conveyer to the pick up section of the drag conveyer. Only a portion of the V trough conveyer is shown, being that at which the transfer takes place. The V trough conveyer comprises a conveyer trough 10 having a flat bottom channel section 11 in which a moving belt 12 travels in the direction as indicated by the arrow. A message blank 13 is shown in transfer position in the conveyer trough. The message blank is brought into transfer position by the traveling belt 12 which carries it forward toward the end of the trough until it has come against a plate 14 disposed across the trough in the path of the message. Two pairs of lifting cams 15 and 16 are mounted on shafts 17 and 18 at opposite sides of the conveyer trough 10. The cams are spaced apart on the shafts at a distance less than the usual length of a message blank.

As shown in Figs. 4 and 5, each of the cams is provided with a slot 19 which fits over a flat sided section 20 of the shaft. A spring 22 is fitted in one side of the slot for holding the opposite side of the slot of the cam normally against the shaft, and which permits the cam to move transversely of the shaft when pressure is exerted on the long or nose side of the cam by two of the cams coming together, as will presently be explained.

The cam shafts 17 and 18 are arranged to run together and are kept in the same angular relation to each other by gears 23 and 24 mounted on the ends of the cam shafts. The shaft 18 is driven by suitable means and rotates in a clockwise direction. The shaft 17 is driven from the shaft 18 through gears 23 and 24 and rotates in a counterclockwise direction. As the shafts rotate the projecting or nose portion of the lifting cams are simultaneously brought toward each other and come together through slots 25 provided in the sides of the V trough. The nose portions of the cams meet each other with a rolling action and move in an upward direction as the shafts rotate. Any message blank, such as the blank 13, which may have been carried to transfer position in the trough 10, will be gripped between the lifting cams and carried upward in a substantially vertical direction which will cause the upper edge of the sheet or blank to be inserted into the inlet of the pick up section 31 of the drag conveyer.

The pick up section of the drag conveyer comprises a conveyer channel 32 disposed in a substantially vertical position with a depending lip portion 33 projecting downwardly with an outward curve. A conveyer belt 34 travels in the channel in the direction indicated by the arrows and passes around a return roller 35 disposed opposite the lip portion of the conveyer channel. This arrangement of the pick up section is disposed immediately over the transfer position of the V trough conveyer, and is arranged so that the meeting point of the conveyer belt 34 and the bottom of the channel 32 is centered substantially over the upper edge of the message blank about to be transferred.

As the lifting cams rotate and bring the message blank upward, the upper edge of the blank will be inserted between the channel 32 and the conveyer belt 34 of the pick up section. The upper edge of the message blank will be guided into place by the depending lip 33 and the portion of the belt passing around the return roller 35. As the message enters the pick up section it will be gripped by the belt 34 and urged upward until released by the cams. The belt will then carry it forward along the channel to the desired destination. Fig. 6 shows diagrammatic views of the operation of the transfer lifting cams as they carry a message blank upward to the inlet of the pick up conveyer. The lower view a shows the message blank as it is initially gripped by the cams. The central view b shows the message blank having been lifted to the inlet entrance of the pick-up conveyer. It will be noted that as the rotating cams come together with their rolling motion that they will be forced outwardly transversely of their respective shafts until the nose of the cams have reached a substantially horizontal position. As already explained the slots 19 in the cams permit the cams to move outwardly on the shafts, while the springs 22 hold the noses of the cams in contact with the message blank. As the cams rotate beyond the horizontal position the springs cause them to move inward and keep their noses in contact with the blank until the outward part of the slot comes again in contact with the shaft, as shown in the upper view c, at which time the cam noses move away from contact with the message blank, releasing the same to the pick-up conveyer.

While a message blank is being transferred or lifted out of the V trough it would be undesirable to have other message blanks arriving at transfer position. They would probably interfere with the movement of the blank being transferred or be kicked out of the conveyer trough by the movement of the cams. To prevent this from occurring a cut-off or stop pin 41 is arranged to be inserted through an opening 42 in one side of the trough and moved across the path of the message blanks during the portion of the revolution of the cams in which a message blank is being transferred and withdrawn from the path of the blanks during the portion of the revolution of the cams in which they are out of contact. The desired movement of the cut-off pin 41 is provided by an actuating cam 43 mounted on the end of the shaft 17 and having a profile suitable to operate the stop pin through a lever 44 to produce the movement just described. A follower roller 45 is carried by the lever 44 and held against the surface of the actuating cam by a retractile spring 46. The lower end of the lever 44 terminates with a yoke 47 which straddles the pin 41 between two collars 48 and 49 made fast on the pin. As the roller 45 follows the profile of the actuating cam 43 the lever 44 is swung back and forth to insert and withdraw the stop pin as described.

As such times as the stop pin 41 is withdrawn, message blanks in the conveyer trough may pass freely to the transfer position. To insure that the lifting cams will properly engage the message blanks, it is desirable that the blanks be held in a substantially vertical position. This is accomplished by providing deflector plates 50 and 51 disposed opposite each other in the V trough at the approach side of the transfer position in the trough.

From the above description, the operation of the transfer mechanism will be clear and it will be observed that message blanks or other sheet material which are conveyed along a V trough conveyer will be readily transferred from the V trough conveyer directly to the inlet of a pick up conveyer of the drag type without interference or without entanglement of the messages. It will also be observed that all movements of the message blanks are accomplished by positively moving elements or mechanisms and that the force of gravity is not relied upon at any step of the operation. This makes for a more positive and reliable transfer mechanism. While the pick up conveyer section is described as a section of the drag conveyer type, a double strap or other suitable conveyer arrangement might be employed instead of the one shown and described.

Figure 8:
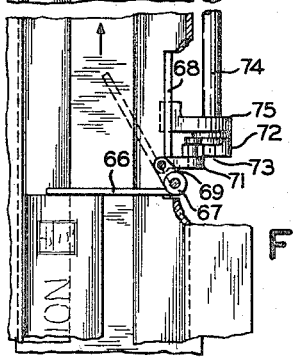
Fig. 8 is a view partly in plan and partly in section of the mechanism shown in Fig. 7.

Referring now to Figs. 7 to 10 of the drawings, I have shown another embodiment of my invention in which the operation of lifting or transferring the message blanks out of the V trough is accomplished directly by the moving belt of the pick up conveyer section. A V-trough conveyer, substantially as already described, is shown, and comprises a trough with sides 10, preferably of less width than the sheet material to be conveyed, and a base 11 in which a moving belt 12 travels. Since the transfer position in both embodiments need not necessarily be at the end of the conveyer trough, the transfer position is shown in this embodiment as in the intermediate section of the trough. The message blanks are stopped at transfer position by a movable plate 52 disposed in the trough across the path of the message blanks as shown in Fig. 8.

The pick up conveyer section in this embodiment is arranged so that the pick up conveyer channel 32 extends downwardly and abuts against the upper edge of the left side of the V trough. The terminus of the drag channel is flattened out and an angle formed at the lower end thereof which is secured to the angle formed at the upper side of the V-trough. The channel is arranged so that the inside thereof forms a smooth and uninterrupted continuation of the inside surface of the V-trough. The belt 34 of the pick up conveyer passes around a return roller 35 which in this case is disposed with its axes substantially in line of the upper edge of the V-trough. The return roller is carried between the arms 53 and 54 of a yoke formed at the upper end of a pivoted frame 56 which projects through a slot 57 provided in the right side of the conveyer trough 10. The frame 56 is pivoted at its lower end about a pin 58 and is provided with an outwardly extending arm 59 to the outer end of which is secured a retractile spring 60. By means of the spring 60 the return roller 35 is normally held toward the left side of the V-trough 10 so that the moving belt will be caused to engage, preferably with a very light pressure, the inside surface of the V trough at its upper edge and also the inside surface of the conveyer channel 32.

Means which will presently be described operate to periodically swing the conveyer belt, the return roller 35 and its carrying frame 56 away from the side of the conveyer trough 10 and the pick-up conveyer channel 32. While the return roller and conveyer belt 34 are in their outward position, message blanks such as the blank 13 shown in the drawings, are permitted to be carried by the conveyer belt 12 into transfer position as shown. When the pick-up conveyer belt 34 and return roller 35 come back to normal position, the upper edge of the message 13 will be engaged between the belt 34 and the side of the conveyer trough 10, and the frictional engagement of the moving belt with the message blank will carry the latter upwardly into the vertical run of the pick-up conveyer whence it will be transported to the desired destination.

Figure 10:
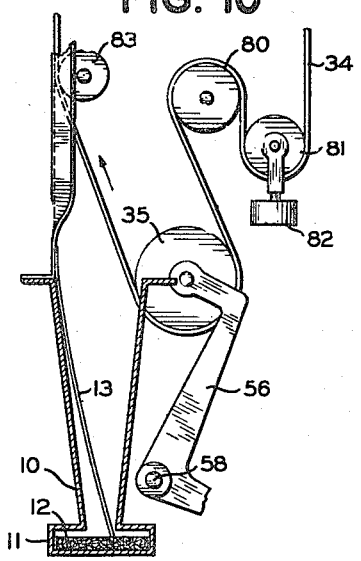
Fig. 10 is a detail view showing take up means for the conveyer belt shown in Fig. 7.
Figure 9:
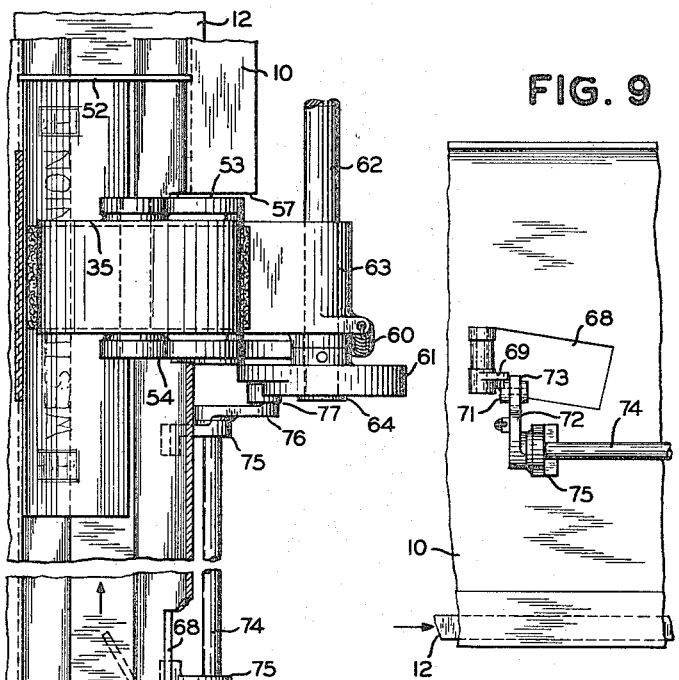
Fig. 9 is a view in side elevation of the mechanism shown in Fig. 7.

The arrangement for swinging the conveyer belt 34 and return roller away from its normal position and permitting the same to return at periodic intervals, comprises an actuating cam 61 mounted rigidly on a shaft 62 which is driven by any suitable means in a counter clockwise direction. The cam shaft rotates in a suitable bearing provided in a bracket 63 secured to the right side of the conveyer trough 10. This bracket also provides a suitable pivotal bearing for the framework 56. As the actuating cam rotates, a follower roller 64, mounted on the arm 59 of the framework 56, follows the profile of the cam surface. As the high part of the cam passes over the follower roller 64, the same is forced downward to rock the framework 56 in a clockwise direction and swing the drag belt 34 and return roller 35 away from the left side of the conveyer trough 10 to a position substantially as shown in Fig. 10. In this position the follower roller is riding on the high surface of the cam. As the cam continues to rotate, the low part of the cam surface comes over the follower roller 64 and the retractible spring 60 returns the conveyer belt 34 and roller 35 to their normal transferring position.

While the conveyer belt 34 of the pick-up roller is held in its outward or open position, message blanks 13 are permitted to be moved forward and carried in to pick-up position. On the other hand, while the belt of the pick-up conveyer is in conveying or transfer position, messages are held back from the transfer or conveying position. This is accomplished by a plate 66 which may be supported to pivot at its right end as shown at 67. An opening 68 is provided in the side of the conveyer trough into which the plate 66 may recede to provide an uninterrupted passage for the message blanks during such periods as they are permitted to move forward, as already set forth. Means are provided for swinging the plate 66 into and out of the conveyer channel in accordance with the position of the conveyer belt 34 and return roller 35 of the pick-up conveyer. An arm 69 is rigidly secured to the plate 66 and connected by a link 71 to a crank 72 through the yoke 73. The crank 72 is secured to a jack shaft 74 which extends back to a point adjacent the actuating cam 62. The jack shaft is suitably supported in brackets 75. Another crank 76 is secured to the other end of the jack shaft and has a follower roller 77 at the outer end thereof arranged to bear upon one half of the surface of the actuating cam 61. As the cam rotates from the position shown in Fig. 7, the follower roller rides up on the receding cam surface 79 to the high portion of the cam. This movement causes the jack shaft to rotate in a clockwise direction and through the link 71 swings the plate 66 around into the recess or opening 68 and permits the message blanks or sheets which have accumulated before the plate to be moved into transfer position, which position is determined by the message blanks coming against the stop plate 52. Since the follower roller 77 is positioned ahead of the follower roller 64 with respect to the profile surface of the cam 61, the stop plate or gate 66 will be opened ahead of the movement of the pick-up belt 34 on its outward swing and will likewise be closed ahead of the movement of the pick-up belt back to normal position. It is evident that the leading of the movement of the gate 66 with respect to the movement of the pick-up conveyer is desirable because of the time required for the messages to come into conveying position from a position before the gate. In cases where the lead of the gate in opening would be too great, the profile of the upward portion of the cam surface over which the follower roller 77 rides, may be cut back with respect to the other portion of the surface as shown at 79.

It will be observed, that the swinging of the return roller 35 and the conveyer belt 34 is about a point at the lower end of the frame 56 represented by a pivot end 58. As this swing takes place, it is evident that the axis of the roller 35 will have a slight movement up and down with respect to the conveyer channel of the pick-up conveyer. In order to allow this movement to take place freely, it is necessary to provide takeup means for the belt 34. Suitable takeup means is shown in Fig. 10 which comprises a roller 80 mounted on a rigid support, and a roller 81 supported in a downward loop of the belt 34, and provided with a suitable weight 82 secured thereto to maintain proper tension in the belt. When the lower end of the belt of the pick-up conveyer is brought to its outward position as shown in Fig. 10, it is desirable to provide means for maintaining the upper portion of the belt in its normal position in the conveyer channel to insure that message blanks traveling along the upper part of the conveyer are held in the up-take section of the pick-up conveyer and continued on their course. Means for maintaining the belt in proper relation may be provided by a suitable roller 83 supported so as to engage the back of the belt and hold it in its normal position in the channel. The roller 83 is preferably located at a suitable distance above the return roller 35 for permitting the lower end of the belt 34 to swing outward and admit the message blanks between the same and the back of the conveyer channel.

From the foregoing description it will be apparent that the latter embodiment of my invention provides a relatively simple conveyer transfer arrangement for transferring sheets of material such as message blanks from a V-trough conveyer to a drag type conveyer. It will also be apparent that the message blanks are transferred positively and directly from the V-trough to the pick-up section of the drag conveyer, and that at no point is the force of gravity relied upon for successful operation of the apparatus. It will further be apparent that this arrangement provides a very compact and reliable transfer mechanism which will effect rapid and reliable transfer of message blanks from a V-trough conveyer. In addition to these features, it will be observed that a transfer arrangement of the character described may be disposed at any desirable point along a V-trough conveyer and arranged to pick up and transfer message blanks over any desired period of time, and further that during other periods of time the transfer mechanism may be stopped or rendered inoperative and the mechanism held out of the path so that they may continue uninterruptedly along the V-trough channel. The removal of the stop plate 52 will permit the messages to pass beyond the location of the transfer mechanism to any other desired point in the V-trough conveyer. This feature is very desirable when at certain times the messages are to be fed into the pick-up section of a rapid conveyer while at certain other times it would be desirable to allow the message blanks to proceed along the V-trough conveyer to some other discharge or transfer position, such as a box or table before one or more distribution clerks.

From the foregoing description it will be further evident that I have provided according to my invention a transfer mechanism which provides rapid and direct transfer of messages from V-trough conveyers into the pick-up or inlet of a different system of conveyers which will usually provide a more rapid transportation of the message blanks to the desired destination.

It is to be understood that even though my invention has been described in connection with V-trough conveyers, that it is applicable to any type of conveyers in which the message blanks are transported in a substantially vertical or edgewise position; and further, that the pick-up conveyer may be any type of conveyer system which positively engages and transfers the messages as they are delivered from the vertical conveyer.

While I have shown my invention in but two forms, it will be obvious to those skilled in the art that it is not so limited but is susceptible to various other changes and modifications without departing from the spirit thereof, and I desire, therefore, that only such limitations shall be placed thereon as are imposed by the prior art or as specifically set forth in the appended claims.

I claim as my invention:

1. In a conveyer system, a belt conveyer adapted to transport sheets of material in a substantially vertical position and horizontal direction, a second belt conveyer disposed above and having an inlet immediately over the first conveyer, and transfer means including a rotating element arranged to be periodically moved into position to grip the sheets of material while in conveying position in the first conveyer and lift the sheets therefrom and feed the same into the inlet of the second conveyer.

2. In a conveyer system, a belt conveyer adapted to transport sheet material in a substantially vertical position and horizontal direction, comprising a V trough disposed in a substantially horizontal position and a belt traveling in the base of the trough, a second belt conveyer disposed transversely of the first conveyer, a pair of moving elements arranged to periodically come toward each other and grip between them sheets of material in the V trough and propel the same upward and direct them into the inlet of the transverse conveyer.

3. In a conveyer system, a conveyer adapted to transport sheet material in a substantially vertical position, comprising a trough and a conveyer element traveling in the base thereof, means to stop the sheet material in the trough at a transfer position, a second conveyer disposed transversely of the first conveyer and having an inlet immediately above the transfer position, said second conveyer comprising a channel and a moving belt arranged to travel in the channel and a movable element for periodically moving the belt into and out of engagement with the channel whereby sheet material which arrives at the transfer position in the first conveyer will be engaged between the belt and the channel of the second when the movable element brings the belt against the channel.

4. In a conveyer system, a conveyer adapted to transport material in a substantially vertical position, comprising a V-shaped trough, a conveyer element adapted to travel in the base of the trough, a drag conveyer comprising a conveyer channel and a belt traveling in engagement therewith, said drag conveyer being disposed transversely of the first conveyer and having the channel thereof arranged to terminate in abutting relation with one side of the trough and a guide roller for the belt of the drag conveyer disposed at the other side of the trough and arranged to hold the belt in engagement with the drag conveyer channel, and means to periodically move the guide roller outward from the drag conveyer channel and back to normal position whereby sheets of material may move into transfer position while the guide roller is in its outward position and be engaged between the belt and the channel when the guide roller is returned to normal position.

5. In a conveyer system, a belt conveyer adapted to transport sheet material in a substantially vertical position and horizontal direction, comprising a V-shaped trough having means to stop the sheet material in a transfer position in the trough and a traveling belt for conveying the material along the trough, a second conveyer disposed adjacent the transfer position of the first conveyer, a pair of rotating elements disposed on opposite sides of the trough at the transfer position, said pair of elements being arranged so that during one part of their revolution they come together and grip the opposite sides of sheets of material in transfer position and discharge the same into the inlet of the second conveyer.

6. In a conveyer system, a conveyer adapted to transport sheet material in a substantially vertical position, comprising a trough and a conveyer element adapted to travel in the base of a trough, a partition interposed in the trough in the path of the material being conveyed to stop the material in a transfer position, a second conveyer disposed transversely of the first conveyer and having an inlet arranged to receive material stopped in the first conveyer at the transfer position, means to periodically transfer the material from the first to the second conveyer, a movable element arranged to be interposed in the path of the sheet material ahead of the transfer position, and means to move said element into the path during the period in which material in transfer position is being withdrawn.

MICHAEL V. CREEDON.